United States Patent
Gilbert et al.

(10) Patent No.: US 12,401,501 B2
(45) Date of Patent: *Aug. 26, 2025

(54) METHODS AND APPARATUS FOR QUANTUM-RESISTANT NETWORK COMMUNICATION

(71) Applicant: Blue Ridge Networks, Inc., Chantilly, VA (US)

(72) Inventors: Thomas A. Gilbert, Fairfax, VA (US); Kenneth A. Hardwick, Newburg, OR (US); Srinivas R. Mirmira, Bethesda, MD (US)

(73) Assignee: Blue Ridge Networks, Inc., Chantilly, VA (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/195,699

(22) Filed: May 10, 2023

(65) Prior Publication Data

US 2023/0283457 A1    Sep. 7, 2023

Related U.S. Application Data

(63) Continuation of application No. 16/852,935, filed on Apr. 20, 2020, now Pat. No. 11,689,359, which is a
(Continued)

(51) Int. Cl.
*H04L 9/08*    (2006.01)
*H04L 9/14*    (2006.01)
(Continued)

(52) U.S. Cl.
CPC .......... *H04L 9/0844* (2013.01); *H04L 9/0827* (2013.01); *H04L 9/14* (2013.01);
(Continued)

(58) Field of Classification Search
CPC ... H04L 63/045; H04L 9/0827; H04L 9/0844; H04L 9/14; H04L 9/302; H04L 9/3215
See application file for complete search history.

(56) References Cited

U.S. PATENT DOCUMENTS

| | | | |
|---|---|---|---|
| 5,241,599 A * | 8/1993 | Bellovin | H04L 9/0844 380/283 |
| 6,922,774 B2 | 7/2005 | Meushaw et al. | |

(Continued)

FOREIGN PATENT DOCUMENTS

| | | |
|---|---|---|
| EP | 2173055 A1 | 4/2010 |
| WO | WO-2017091267 A1 | 6/2017 |

OTHER PUBLICATIONS

Bellovin, Steven Michael, and Michael Merritt. "Encrypted key exchange: Password-based protocols secure against dictionary attacks." (1992): 72-84. (Year: 1992).*

(Continued)

*Primary Examiner* — Michael Simitoski
(74) *Attorney, Agent, or Firm* — COOLEY LLP (57) ABSTRACT

A method includes sending, to a compute device and via a private channel, a public key for asymmetric encryption. The method also includes concurrently authenticating the compute device and generating a traffic key for symmetric encryption, based at least in part on the public key. The method further includes sending a message to the compute device, the message being encrypted using the traffic key via the symmetric encryption.

15 Claims, 6 Drawing Sheets

Related U.S. Application Data continuation of application No. 16/240,445, filed on Jan. 4, 2019, now Pat. No. 10,630,467.

(51) Int. Cl.
   *H04L 9/30*    (2006.01)
   *H04L 9/32*    (2006.01)
   *H04L 9/40*    (2022.01)

(52) U.S. Cl.
   CPC ............ *H04L 9/302* (2013.01); *H04L 9/3215* (2013.01); *H04L 63/045* (2013.01)

(56) References Cited

U.S. PATENT DOCUMENTS

| | | |
|---|---|---|
| 7,421,578 B1 | 9/2008 | Huang et al. |
| 7,712,143 B2 | 5/2010 | Comlekoglu |
| 7,809,955 B2 | 10/2010 | Comlekoglu |
| 8,549,300 B1 | 10/2013 | Kumar et al. |
| 10,630,467 B1 | 4/2020 | Gilbert et al. |
| 11,689,359 B2 | 6/2023 | Gilbert et al. |
| 2003/0072059 A1 | 4/2003 | Thomas et al. |
| 2004/0090943 A1 | 5/2004 | Da Costa et al. |
| 2004/0167465 A1 | 8/2004 | Mihai et al. |
| 2004/0228492 A1 | 11/2004 | Park |
| 2009/0217043 A1 | 8/2009 | Metke et al. |
| 2009/0323954 A1 | 12/2009 | Sprunk et al. |
| 2012/0042170 A1 | 2/2012 | Curtin et al. |
| 2012/0288092 A1 | 11/2012 | Cakulev et al. |
| 2013/0083926 A1 | 4/2013 | Hughes et al. |
| 2013/0173913 A1 | 7/2013 | Kocsis et al. |
| 2015/0039890 A1 | 2/2015 | Khosravi et al. |
| 2015/0067338 A1 | 3/2015 | Gero et al. |
| 2015/0120569 A1 | 4/2015 | Belshe et al. |
| 2015/0222619 A1 | 8/2015 | Hughes et al. |
| 2015/0244525 A1 | 8/2015 | McCusker et al. |
| 2015/0288514 A1 | 10/2015 | Pahl et al. |
| 2016/0055485 A1 | 2/2016 | Benoit et al. |
| 2016/0057118 A1 | 2/2016 | Lee et al. |
| 2016/0373418 A1 | 12/2016 | Stahl |
| 2017/0006004 A1 | 1/2017 | Li et al. |
| 2017/0323116 A1 | 11/2017 | Mumford et al. |
| 2018/0041507 A1 | 2/2018 | Sivarajan et al. |
| 2018/0131551 A1 | 5/2018 | Murakami et al. |
| 2020/0382292 A1 | 12/2020 | Gilbert et al. |

OTHER PUBLICATIONS

Blue Ridge Session Authentication, 5 pages, Published before Jan. 4, 2018. (Year: 2018).*

Mandal, Sayonnha et al. "Implementing Diffie-Hellman key exchange using quantum EPR pairs", 2015. (Year: 2015).*

Blake-Wilson, Simon, and Menezes, Alfred, "Authenticated Diffie-Hellman Key Agreement Protocols." International Workshop on Selected Areas in Cryptography. Springer, Berlin, Heidelberg, 1998, 339-361.

Blue Ridge Session Authentication, 5 pages, Published before Jan. 4, 2018.

BorderGuard 5000, 2008 Blue Ridge Networks, Inc., 2 pages.

Cremers, Cas, and Horvat, Marko, "Improving the ISO/IEC 11770 standard for key management techniques." International Journal of Information Security, 2016, 15(6):659-673.

Extended European Search Report mailed on Feb. 21, 2020, for European Application No. 20150277.0, 7 pages.

Hardwick, "Blue Ridge Networks BorderGuard 5000 Vendor information for FIPS 140-2 Derived Test Requirements," Blue Ridge Proprietary Material, Mar. 13, 2006, 46 pages.

Hugo, K., "SIGMA: The 'SIGn-and-MAc' Approach to Authenticated Diffie-Hellman and its use in the IKE Protocols." Annual International Cryptology Conference. Springer, Berlin, Heidelberg, 2003, 32 pages.

Orman, "The Oakley Key Determination Protocol," Department of Computer Science University of Arizona, Nov. 1998, 56 pages.

Sehgal, Parth, et al. "Modification of Diffie-Hellman Algorithm to Provide More Secure Key Exchange." International Journal of Engineering & Technology, 2013, 2498-2501.

VPN Manager Quick Start Guide, Copyright Blue Ridge Networks 2005, 12 pages.

Yang et al., "On the post-quantum security of encrypted key exchange protocols," May 24, 2013, Retrieved from the Internet: https://arxiv.org/pdf/1305.5640.pdf, 14 pages.

* cited by examiner

METHODS AND APPARATUS FOR QUANTUM-RESISTANT NETWORK COMMUNICATION

CROSS-REFERENCE TO RELATED APPLICATIONS

This application is a continuation of U.S. patent application Ser. No. 16/852,935, filed Apr. 20, 2020, now U.S. Pat. No. 11,689,359, which is a continuation of and claims priority to U.S. patent application Ser. No. 16/240,445, filed Jan. 4, 2019, now U.S. Pat. No. 10,630,467, and titled "Methods and Apparatus for Quantum-Resistant Network Communication," the contents of which are incorporated herein by reference in its entirety.

FIELD

One or more embodiments relate to apparatus and methods for secure network communications that are resistant to attacks by quantum computers.

BACKGROUND

Rivest-Shamir-Adleman (RSA) public-key cryptography has been widely used in various secure communication protocols, such as Secure Sockets Layer (SSL) and Transport Layer Security (TLS). Public-key certificates defined in the X.509 standard are also employed to verify the identities of people, documents, organizations, and/or devices. Typically, a world-wide network of Public-key Certificate Authorities creates X.509 certificates and digitally signs these certificates to attest to these digital identities.

The security of public-key cryptography is usually based on the impracticality of solving certain mathematical problems using currently available computing powers. For example, RSA public-key cryptography is based on the difficulty of factoring very large integers. Other public-key systems, such as the Diffie-Hellman key-agreement protocol or the Digital Signature Algorithm, are based on mathematical problems like computing discrete logarithms.

The emergence of quantum computing, however, threatens the security of public-key cryptography due to its unprecedented computing power. For example, it is believed that integer factorization can be efficiently solved by a quantum computer using Shor's algorithm to find the factors of the integer, thereby threatening to break all RSA public-key cryptographic systems. These systems are currently used to protect secure Web pages, emails, and many other types of data, and their security can have significant implications for almost everyone.

Although quantum resistant public-key crypto-systems are being developed, none has been shown to be practical for widespread use, so far. Thus, a need exists for methods and apparatus for network communications that are resistant to attacks or encryption by quantum computers.

SUMMARY

Some embodiments described herein relate generally to secure network communications, and, in particular, to methods and apparatus for secure network communications that are resistant to attacks by quantum computers. In some embodiments, a method includes sending, to a compute device and via a private channel, a public key for asymmetric encryption. The method also includes concurrently authenticating the compute device and generating a traffic key for symmetric encryption, based at least in part on the public key. The method further includes sending a message to the compute device, the message being encrypted using the traffic key via the symmetric encryption.

In some embodiments, an apparatus includes a communication interface configured to send, to a compute device, a public key for asymmetric encryption via a private channel. The apparatus also includes a processor operably coupled to the communication interface. The processor is configured to concurrently authenticate the compute device and generate a traffic key for symmetric encryption based at least in part on the public key. The processor is further configured to control the communication interface to send a message to the compute device, the message being encrypted using the traffic key via the symmetric encryption.

In some embodiments, an apparatus includes a communication interface configured to receive, from a compute device, a first public key for asymmetric encryption via a private channel. The apparatus also includes a processor operably coupled to the communication interface. The processor is configured to concurrently authenticate the compute device and generate a traffic key for symmetric encryption by receiving a request from the compute device. The request includes a first set of Diffie-Hellman key exchange parameters and a first nonce. The request is encrypted using at least a first private key of a first asymmetric key pair that includes the first public key. The processor is further configured to concurrently authenticate the compute device and generate a traffic key for symmetric encryption by decrypting the request using at least the public key and generating a reply including the first nonce, a second set of Diffie-Hellman key exchange parameters, and a second nonce. The processor is also configured to encrypt the reply using a second private key in a second asymmetric key pair that further includes a second public key and send the reply to the compute device.

In some embodiments, a method includes sending, from a first compute device to a second compute device, a first public key in a first asymmetric key pair for asymmetric encryption via a private channel. The method also includes receiving, from the second compute device, a second public key in a second asymmetric key pair via the private channel. The method further includes sending a request from the first compute device to the second compute device. The request is encrypted at least by (1) a first private key in the first asymmetric key pair that includes the first public key and (2) the second public key in the second asymmetric key pair. The request includes a first set of Diffie-Hellman key exchange parameters and a first nonce, and the first set of Diffie-Hellman key exchange parameters are further encrypted by a temporary key via symmetric encryption. The method also includes receiving a reply from the second compute device, and the reply is encrypted at least by the first public key and a second private key in the second asymmetric key pair. The reply includes a second set of Diffie-Hellman key exchange parameters, the first nonce, and a second nonce. The method also includes generating a traffic key based on the first set and the second set of Diffie-Hellman key exchange parameters and authenticating the second compute device based on the first nonce received from the second compute device. The method also includes discarding the temporary key and sending a status message to the second compute device, the status message including the second nonce and being encrypted by the traffic key.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Methods, apparatus, and systems described herein employ a quantum-resistant approach to establish a secure and private communication channel over otherwise un-trustable communications media between two known entities (also referred to as parties or nodes). In this approach, the two entities acquire each other's public key over a secure channel. The public keys are then used for subsequent communications, which can be exchanged over unsecure or public media, to achieve concurrent authentication and key generation. During authentication, each entity verifies the identity of the other entity based on comparing the nonce (e.g., random bit strings) sent out to the other party and the nonce received back from the other party. The key (also referred to as a traffic key or a session key) created during the key generation process is unique to each session and is only known to the two entities. In addition, the two entities typically discard the session key upon termination of the session.

The approach described herein has several unique aspects and benefits. First, the approach can preserve the proven practicality of RSA public-key cryptography over untrustable communications media, while adding the benefit of quantum resistance. Because the encrypted plaintext of the nonce used in authentication is random and the public key pairs are not exposed, an observer of the ciphered text exchange is unlikely to mount traditional or quantum computing attacks that would enable, for instance, a man-in-the-middle attack on the dialogue.

Additionally, a one-time use symmetric encryption key (i.e., the session key) is generated and sent to the other party within the RSA encrypted data. This key is used to symmetrically encrypt data that is used in a traditional Diffie-Hellman key agreement protocol so it can be successfully concluded without the possibility of a quantum computing attack. Furthermore, possible known plaintext attacks on RSA encryption can also be prevented by only encrypting protocol fields containing unique per-instance random values (e.g., the nonce and the Diffie-Hellman key exchange parameters).

Second, because the session key is usually discarded after each session, any information an attacker may obtain prior to or subsequent to the session will not aid the breaking of the session encryption. This property is also referred to as perfect forward secrecy.

Third, the approach described herein has superior scalability compared to known X.509 systems. The X.509 system typically creates a hierarchy of certificate authorities that may issue certificates for subsidiary certificate authorities. Each certificate authority may issue certificates for individuals, organizations, or devices. This scheme can efficiently scale to hundreds of millions of unique identities. But it also creates a fragile network of interdependent trust relationships, in which a single failure may disrepute the identity of many.

In contrast, in the approach described herein, the scalability of closed user groups and the number of nodes that may securely communicate can be achieved by using intermediate message exchanges. Users have bilateral trust with these intermediate message exchanges, which in turn have trust relationships with many other users. Any node can choose to dis-trust any bilateral relationship without affecting the rest of the network.

In addition, the approach also allows fast and efficient authentication because the only information that is used for each party to establish a secure communication with another party is the public key of the other party and the network address over which to initiate the communications. Accordingly, the approach can be readily extended to a large-scale network including multiple nodes.

Fourth, because every communication session is established based on a-priori public-key trust, and messages employed for session establishment are uniquely encrypted using the public key, the responding party can ignore any message that is not cryptographically authenticated from first to last. Accordingly, attempted reconnaissance using scanning or probing protocols is not able to break the security of the protocol. In addition, there is no externally readable identity in this approach. Instead, only an arbitrary index is used to select the appropriate key material previously provided. More specifically, a party can have bilateral trust relationships with multiple parties (e.g., possessing the public keys of these parties). Therefore, when an initial request is received from one of these entrusted parties, a plaintext index field in the request message is employed to select the correct public key so as to decrypt the received request message. In some alternative embodiments, the party can decrypt the request message using a trial and error approach, i.e., the party can try all public keys it possesses to decrypt the request message until one of them works.

Figure 1:
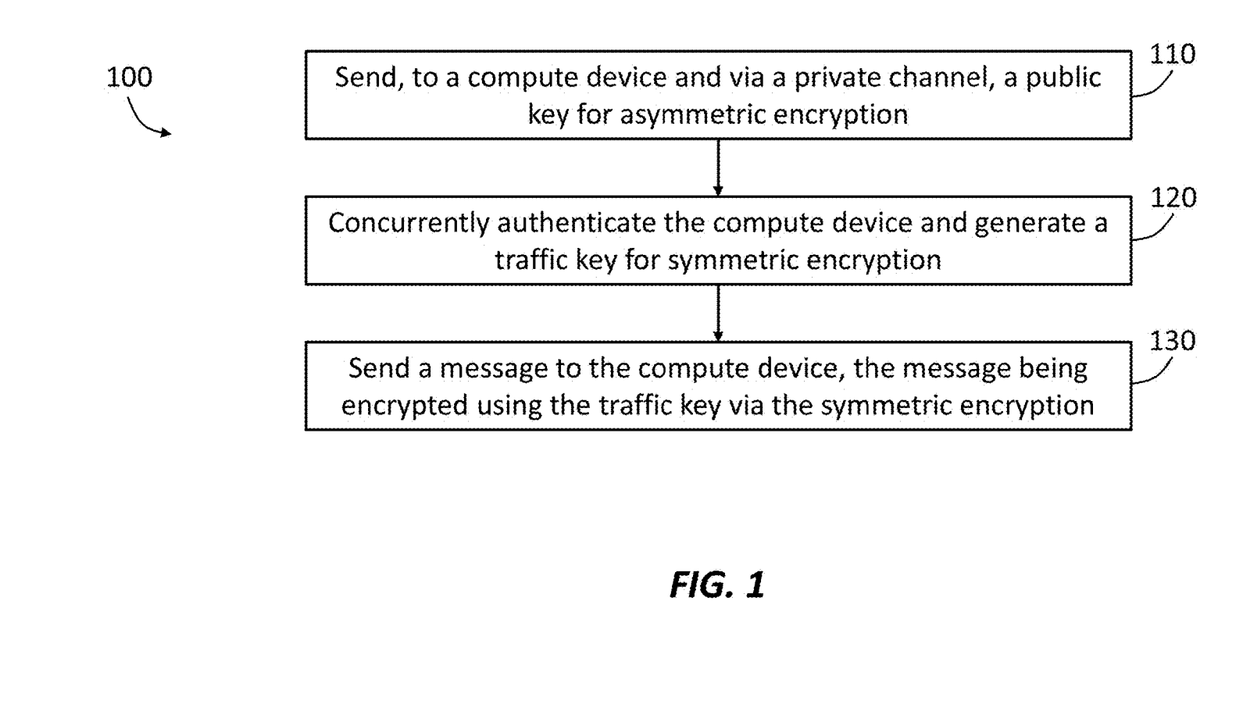
FIG. 1 shows a flowchart illustrating methods of secure network communications that are resistant to attacks by quantum computers, according to an embodiment.

FIG. 1 shows a flowchart illustrating a method 100 for secure network communications, according to an embodiment. The method 100 includes sending, to a compute device and via a private channel, a public key for asymmetric encryption at 110. As used herein, a private channel refers to a communication channel supporting communications that resists eavesdropping by a third party and prevents tampering or modifying of the communications. For example, a private channel can include a local cable and a user can physically observe that such local cable is free from third-party tampering or interception.

The method 100 also includes, at 120, concurrently authenticating the compute device and generating a traffic key for symmetric encryption, based at least in part on the public key. As used herein, concurrent authentication and key generation refers to a process in which the same messages exchanged between two devices can be used for both authentication and key generation purposes. Concurrent authentication and key generation is achieved via messages exchange between the sending device and the compute device, and the message exchange is based at least in part on the public key. The sending device and/or the compute device then process the received messages to authenticate each other and/or generate the traffic key. As used herein, concurrent authentication and key generation includes both the message exchange and the message processing. In addition, the sending device in the method 100 is also referred to as an originator, and the compute device in the method 100 is also referred to as a responder or a receiving device.

The method 100 further includes, at 130, sending a message to the compute device, the message being encrypted using the traffic key via the symmetric encryption. After 120, the identity of the compute device is authenticated, and the communication with the compute device is thus regarded as secure. The message sent to the compute device is encrypted using the traffic key, which is typically for symmetric encryption, to increase the encryption and decryption efficiency.

In some embodiments, step 110 forms at least part of a provisioning process. Provisioning is an activity that typically occurs infrequently but at least once for each equipment that implements the quantum-resistant approach described herein. The purpose of provisioning is to create a cryptographic closed group of network equipment by the exchange of the public key of an asymmetric key pair and other information. Each network equipment usually has a unique public key (e.g., RSA public key). In some embodiments, only provisioned equipment can implement the quantum resistant approach described herein, and such implementation is only with other provisioned equipment within its closed group.

In some embodiments, the provisioning also includes receiving the public key of the compute device so as to decrypt messages sent from the compute device and allow the compute device to authenticate the sending device. In some embodiments, the traffic key is generated by the coordinated action of both the sending device and the compute device (e.g., via Diffie-Hellman protocol as described below with more details).

In some embodiments, activities performed by provisioned network equipment (i.e., after provisioning) are referred to as operation of the network equipment, including the establishment of communication session (e.g., step 120), actual use of the communication sessions (e.g., step 130), and termination of the communication sessions. In some embodiments, the provisioning of network equipment is conducted via the private channel, and operations of the network equipment can be conducted over any type of communication media, including unsecure and even untrustable communication media, such as a public channel. As used herein, a public channel (or public communication medium) refers to a communication channel that is assumed to be observable by others, i.e., there is no assumption of privacy. A public channel may also be subject to undetectable message modification, message deletion, and/or insertion of bogus messages.

In some embodiments, a network equipment can be provisioned at one location (e.g., within the premise of a server via a local cable) to form part of the closed user group. The provisioned network equipment can then be moved to any other location for subsequent actions, such as session establishment, because these operations can be conducted on any type of communication media. For example, an entity (e.g., a company) can provision multiple network equipment within its premise and then distribute these network equipment to remote locations without compromising the security of communications among these network equipment.

In some embodiments, the provisioning process is facilitated by a management system (e.g., see FIG. 3 and related discussion below). In these embodiments, the public key of the sending compute device is first sent to the management system, which then sends the public key to the receiving compute device. The communications among the sending device, the compute device, and the management system at this step (i.e. provisioning) are all conducted via the private channel.

The management system is configured to distribute and/or exchange public keys among network nodes for subsequent use. In some embodiments, the management system can also be configured to store the public keys of each network equipment within the closed group. Therefore, when a new network equipment joins the closed group, the management system can just send the public keys of provisioned network equipment to this new network equipment, i.e., the new network equipment does not need to query each provisioned network equipment to obtain the public keys. In some embodiments, provisioning of network equipment is facilitated by the management system, and operations of provisioned network equipment do not involve the management system.

The public key as used in the method 100 can include any type of public key in a public-private key pair for asymmetric encryption. The public-private key pair also includes a corresponding private key. Data encrypted by the public key can be decrypted by the private key in the same public-private key pair, and data encrypted by the private key can also be decrypted by the public key in the same public-private key pair. In some embodiments, the asymmetric encryption includes the asymmetric RSA encryption.

In some embodiments, the key generation at 120 can be achieved based on the Diffie-Hellman key exchange protocol. In these embodiments, the two entities in the communication session agree on a traffic key that the two entities can use for a symmetric encryption, in such a way that an eavesdropper cannot obtain the key. More specifically, the two entities (e.g., the sending device and the compute device) first agree on a prime number p and a base number g. The first entity chooses a secret number a, and sends the second entity ($g^a$ mod p). The second entity chooses a secret number b, and sends the first entity ($g^b$ mod p). The first entity can then derive the key by computing $((g^b \bmod p)^a \bmod p)$, and the second party can derive the key by computing $((g^a \bmod p)^b \bmod p)$.

In conventional Diffie-Hellman protocol, the prime number p and the base number g are usually not encrypted, and such an unprotected D-H exchange over a public network is subject to a man-in-the-middle (MITM) attack. In the quantum-resistant approach described herein, however, the key exchange materials, including the prime number p and the base number g, are also encrypted. The encryption of the key exchange materials can use one or more of the following keys: the public key of the receiving device, the private key of the sending device, and a temporary key $k_{temp}$ (see more details below).

In some embodiments, the concurrent authentication and key generation at 120 is conducted by message exchange between the sending device and the compute device. The messages include a request sent to the compute device, and the request is encrypted at least by the private key in the asymmetric key pair that includes the public key (i.e., the key pair of the sending device). Therefore, the encrypted request can be decrypted by the compute device using the public key of the sending device. In some embodiments, the request is further encrypted using the public key of the compute device and accordingly can be decrypted using the private key of the compute device.

The request includes a first set of Diffie-Hellman key exchange parameters and a nonce. The nonce typically includes a string of random values. The compute device can decrypt the nonce using the public key of the sending device and send it back to the sending device as part of a reply. The sending device can then compare the nonce sent out to the compute device and the nonce received from the compute device. If they are the same, the sending device can verify that the compute device indeed has the correct public key and therefore authenticate the compute device. In some embodiments, the nonce includes a SHA-256 hash. In some embodiments, the nonce includes a SHA-512 hash.

Figure 4:
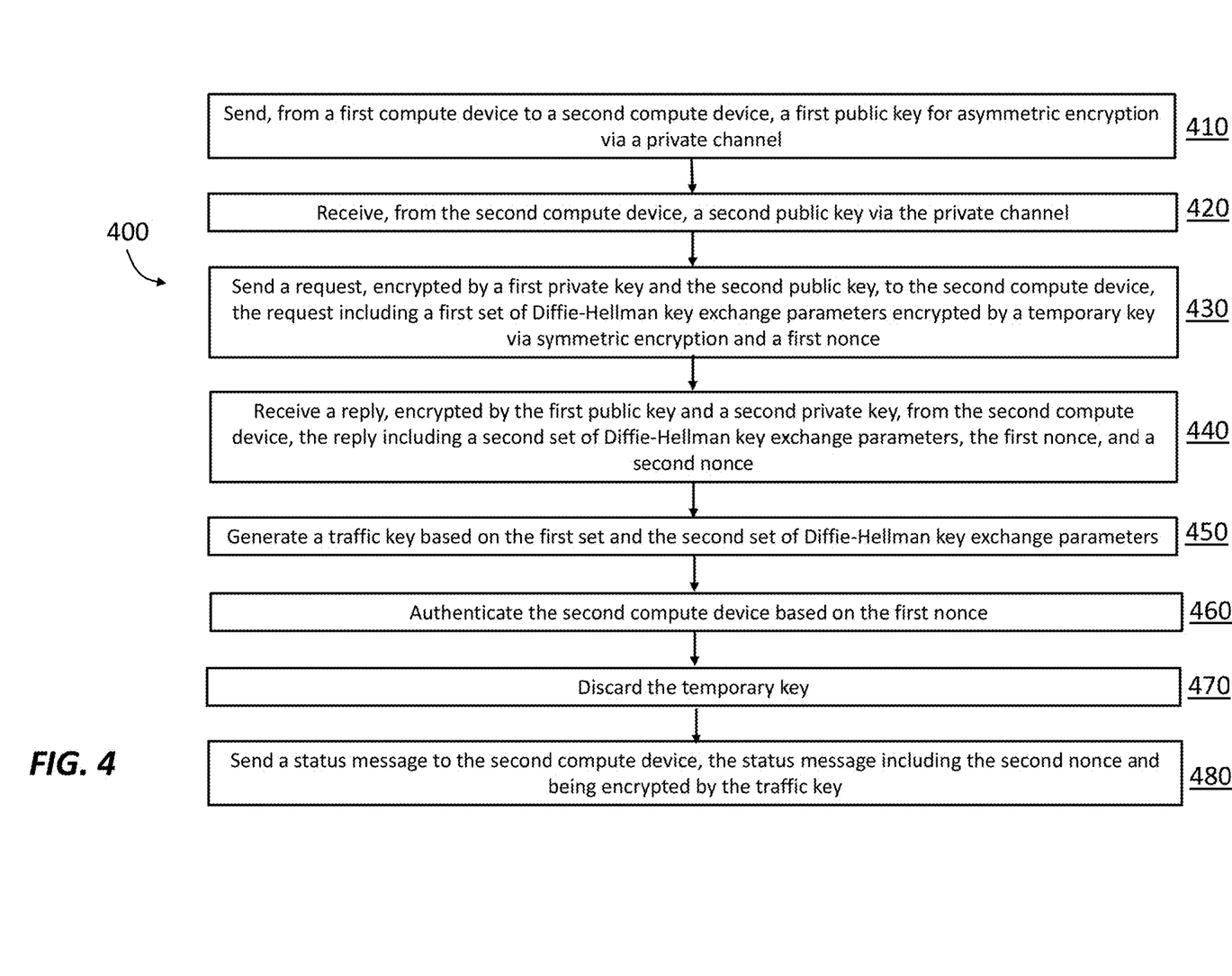
FIG. 4 shows a flowchart illustrating a method of secure network communication using a Diffie-Hellman key exchange protocol, according to an embodiment.

The reply message from the compute device also includes a second set of Diffie-Hellman key exchange parameters, and the traffic key can be generated based on the first set and the second set of Diffie-Hellman key exchange parameters (see, e.g., more details with reference to FIG. 4). The reply message is usually encrypted using the public key of the sending device so that the sending device can decrypt the reply using its own private key.

In some embodiments, the first set of Diffie-Hellman key exchange parameters can include information about the prime number p and the base number g, as well as ($g^a$ mod p). The second set of Diffie-Hellman key exchange parameters can include information about ($g^b$ mod p). Accordingly, the first entity can then derive the key by computing (($g^b$ mod p)$^a$ mod p), and the second party can derive the key by computing (($g^a$ mod p)$^b$ mod p), which has the same value as (($g^b$ mod p)$^a$ mod p). And this value of (($g^b$ mod p)$^a$ mod p) is used as the traffic key for subsequent communications.

In some embodiments, the Diffie-Hellman key exchange parameters (including both the first set of key exchange parameters in the request and the second set of key exchange parameters in the reply) are further encrypted by a temporary key $k_{temp}$. The temporary key can be a unique random symmetric encryption key, such as an Advanced Encryption Standard (AES) key. The key exchange parameters encrypted by the temporary key are then encrypted by asymmetric encryption using the public/private keys. For example, the first set of Diffie-Hellman key exchange parameters in the reply can be first encrypted using the temporary key. The encrypted key exchange parameters and the nonce are then encrypted again using the public key of the compute device (i.e., two-level of encryption). In some embodiments, the reply can be further encrypted using the private key of the sending device (i.e., three-level encryption). Similarly, the second set of Diffie-Hellman key exchange parameters can be first encrypted by the temporary key, followed by asymmetric encryption using the public key of the sending device and the private key of the compute device.

The information about the temporary key is also included in the request. Therefore, the compute device can retrieve the temporary key via decryption and encrypt the second set of the Diffie-Hellman key exchange parameters in the reply using the same temporary key.

In some embodiments, the nonce is encrypted with the public/private keys so as to accomplish the mutual authentication even over public networks, and the Diffie-Hellman key exchange parameters are only encrypted with the temporary key. In these embodiments, the temporary key is also encrypted with the public/private keys by the initiating party to preserve its privacy.

In some embodiments, the method 100 also includes discarding the temporary key. In some embodiments, the temporary key can be discarded after the concurrent authentication and key generation is completed (i.e., a communication session is successfully established). The discarding of the temporary key can be achieved by over-writing the temporary key in the memory that stores the temporary key.

As described herein, each one of the sending device and the compute device has a unique asymmetric key pair including a public key and a private key, i.e., the sending device has a first asymmetric key pair including the first public key and the first private key, and the compute device has a second asymmetric key pair including the second public key and the second private key. In some embodiments, the request sent to the compute device is encrypted by the first private key of the sending device and the second public key of the compute device. The compute device can decrypt the request using the first public key of the sending device and the second private key of the compute device. Similarly, the reply from the compute device is encrypted by the second private key of the compute device and the first public key of the sending device. And the sending device can decrypt the reply using the second public key of the compute device and the first private key of the sending device.

In some embodiments, the reply from the compute device further includes a second nonce different from the nonce sent by the sending device to the compute device. The sending device is configured to decrypt the reply to retrieve the second nonce and send the second nonce back to the compute device as part of a status message for the compute device. Upon receiving the status message, the compute device retrieves the second nonce and compares this second nonce with the second nonce sent to the sending device. If they are the same, the compute device can accordingly authenticate the sending device. In some embodiments, the status message can be encrypted by the traffic key generated at 120.

The descriptions above illustrate several differences between a known approach and the quantum-resistant approach for session establishment. Most known cryptographic network protocols perform session establishment in two phases. During the first phase, a server accepts a connection request from an unknown client and establishes a cryptographically private connection with this unknown client. During the second phase, using this connection, the client and server present their credentials to each other and proceed to form a session for application data traffic if both are satisfied. The key material exchanged for the initial session is usually also reused for application data security.

In the quantum-resistant approach for session establishment described herein, however, key exchange and authentication are intertwined in an exchange of three messages. Accordingly, fewer messages are sent for connection establishment. In addition, the responding party (e.g., a server) does not need to respond to the client in any way unless the client has presented valid credentials in its initial message. Furthermore, no public-keys nor Diffie-Hellman parameters are ever exposed as plaintext, thereby nullifying potential quantum cryptologic attacks.

Figure 2:
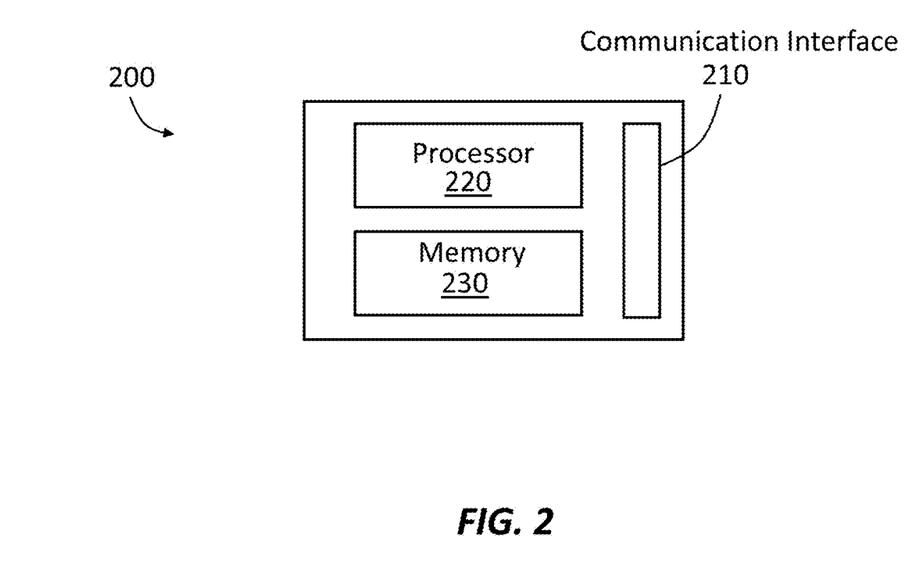
FIG. 2 shows a schematic of an apparatus for secure network communications that are resistant to attacks by quantum computers, according to an embodiment.

FIG. 2 shows a schematic of an apparatus 200 for secure network communications, according to an embodiment. The apparatus 200 includes a communication interface 210 configured to send, to a compute device (not shown in FIG. 2), a public key for asymmetric encryption via a private channel. The apparatus 200 also includes a processor 220 operably coupled to the communication interface 210. The processor 220 is configured to concurrently authenticate the compute device and generate a traffic key for symmetric encryption. The processor 220 is further configured to control the communication interface 210 to send a message to the compute device, and the message is encrypted using the traffic key via the symmetric encryption. The apparatus 200 further includes a memory 230 operably coupled to the processor 220 and/or the communication interface 210. The memory 230 can be configured to store processor executable instructions for the processor 220 to perform any of the methods or portions of the methods described herein.

The communication interface 210 can be any suitable component that can place the apparatus 200 in communication with another entity. In some embodiments, the communication interface 210 includes a network interface card, such as an Ethernet port, a WiFi® radio, a Bluetooth® radio (e.g., a Bluetooth® antenna), a near field communication (NFC) radio, and/or a cellular radio. In some embodiments, the communication interface 210 is configured to communicate with another entity via wired communication (e.g., via a cable). In some embodiments, the communication interface 210 is configured to communicate with another entity via wireless communication (e.g., WiFi®). In some implementations, the communication interface 210 includes a combination of more than one interface. For example, the communication interface 210 can be configured to communicate via both wired and wireless communications.

The processor 220 be a general purpose processor, a Field Programmable Gate Array (FPGA), an Application Specific Integrated Circuit (ASIC), a Digital Signal Processor (DSP), and/or the like. The memory 230 can be, for example, a random access memory (RAM), a memory buffer, a hard drive, a database, an erasable programmable read-only memory (EPROM), an electrically erasable read-only memory (EEPROM), a read-only memory (ROM) and/or so forth.

The apparatus 200 can be configured as an originator and/or a responder in the quantum-resistant approach for secure network communications. As used herein, an originator refers to a provisioned network equipment that initiates the protocol to establish a secure communications session with another provisioned network equipment. In some embodiments, no third-party is involved, and all protocol activities are between the originator and the other node with which the originator wishes to communicate. The responder is also a provisioned network equipment, which is configured to receive an initial packet (e.g., request) from another provisioned equipment and respond to such initial packet (e.g., authenticating the originator, send messages to the originator for the originator to authenticate the responder, and establish a secure communication session).

In some implementations, the communication interface 210 is configured to send the public key via a management system (not shown in FIG. 2), and the processor 220 is configured to concurrently authenticate the compute device and generate the traffic key without using the management system. In some embodiments, the exchange and/or distribution of the public keys between the management system and different entities are all conducted over the private channel (e.g., a local cable), and the direct communications between different entities can be conducted over any type of communication media, including public channels. For example, the concurrent authentication and key generation between the apparatus 200 and another provisioned network equipment can be conducted via the public channel because once provisioned, each network equipment already has the public key of the other party in the communication and the public key is securely distributed without being exposed to potential attackers.

In some embodiments, the processor 220 is configured to concurrently authenticate the compute device and generate the traffic key exchanging messages with the compute device and processing messages received from the compute device. For example, the processor 220 can be configured to generate a request including a first set of Diffie-Hellman key exchange parameters and a nonce and then encrypt the request using at least a private key of an asymmetric key pair that includes the public key. The processor is then configured to control the communication interface 210 to send the request to the compute device.

On the other end of the communication, the compute device is configured to generate a reply and send the reply back to the apparatus 200. The reply is encrypted at least by the public key of the apparatus 200 and includes a second set of Diffie-Hellman key exchange parameters the nonce. The processor 200 is configured to control the communication interface 210 to receive the reply and decrypt the received reply. Upon decryption of the reply, the processor 220 is configured to generate the traffic key using the first set and the second set of Diffie-Hellman key exchange parameters and authenticate the compute device based at least in part on the nonce received from the compute device.

In some implementations, the reply from the compute device further includes a second nonce, and the processor 220 is configured to generate a status message including the second nonce so as to allow the compute device to authenticate the apparatus 200. In this manner, a secure bi-directional communication session can be established between the apparatus 200 and the compute device.

In some implementations, the processor 220 is configured to encrypt the first set of Diffie-Hellman key exchange parameters using a temporary key via a unique random symmetric encryption. The encrypted key exchange parameters are then further encrypted using at least a private key of an asymmetric key pair that includes the public key (i.e., two-level encryption). In some implementations, the request can be further encrypted using the public key of the compute device, i.e., three-level encryption. In addition, the temporary key is also included (as part of the encrypted data) in the request. Accordingly, the compute device can retrieve the temporary key via decryption and encrypt the second set of Diffie-Hellman key exchange parameters in the reply using the retrieved temporary key.

In some implementations, the processor 220 is further configured to discard the temporary key upon the completion of the concurrent authentication and key generation. For example, the processor 200 can be configured to overwrite the portion of the memory 230 that stores the temporary key. In some implementations, the processor 220 is configured to discard the temporary key upon sending out the status message (i.e., ensuring that a communication session is successfully established between the apparatus 200 and the compute device).

In some implementations, the apparatus 200 has a first asymmetric key pair including a first public key and a first private key, and the compute device has a second asymmetric key pair including a second public key and a second private key. In addition, both the apparatus 200 and the compute device are provisioned, i.e., the apparatus 200 has the second public key of the compute device, and the compute device has the first public key of the apparatus 200.

In these implementations, the request sent out by the apparatus 200 can be encrypted by the first private key of the apparatus 200 (i.e., its own private key) and the second public key of the compute device. The compute device can then decrypt the request using the first public key of the apparatus and the second private key of the compute device (i.e., its own private key). The reply from the compute device can be encrypted using the first public key of the apparatus 200 and the second private key of the compute device. Similarly, the apparatus 200 can decrypt the reply using the second public key of the compute device and the first private key of the apparatus 200.

In some implementations, upon authenticating the compute device and generating the traffic key, the processor 210 is configured to generate a status message and control the communication interface 210 to send the status message to the compute device. The status message includes the nonce provided by the compute device so as to allow the compute device to authenticate the apparatus 200. In addition, the status message can be encrypted by the traffic key.

As descried herein, the apparatus 200 can also be configured as a responder in a quantum-resistant approach for network communications according to some embodiments. In these embodiments, the communication interface 210 is configured to receive a first public key associated with the sender to provision the apparatus 200. In addition, the processor 220 is configured to concurrently authenticate the sender and generate a traffic key for symmetric encryption. To this end, the processor 200 is configured to control the communication interface 210 to receive a request from the sender. The request includes a first set of Diffie-Hellman key exchange parameters and a first nonce.

Generally, the request is encrypted using the first private key in the first asymmetric key pair that includes the first public key. Therefore, the processor 220 is configured to decrypt the request using the first public key. In addition, the processor 220 is also configured to generate a reply including the first nonce, a second set of Diffie-Hellman key exchange parameters, and a second nonce. The reply is encrypted using a second private key in a second asymmetric key pair that also includes a second public key. The sender is also provisioned and therefore has the second public key to decrypt the reply.

In some embodiments, the first set of Diffie-Hellman key exchange parameters is further encrypted using a temporary key via a unique random symmetric encryption, and the temporary key is also included in the request from the sender. In these embodiments, the processor 220 is configured to decrypt the request to retrieve the temporary key and encrypting the second set of Diffie-Hellman key exchange parameter using the temporary key.

Figure 3:
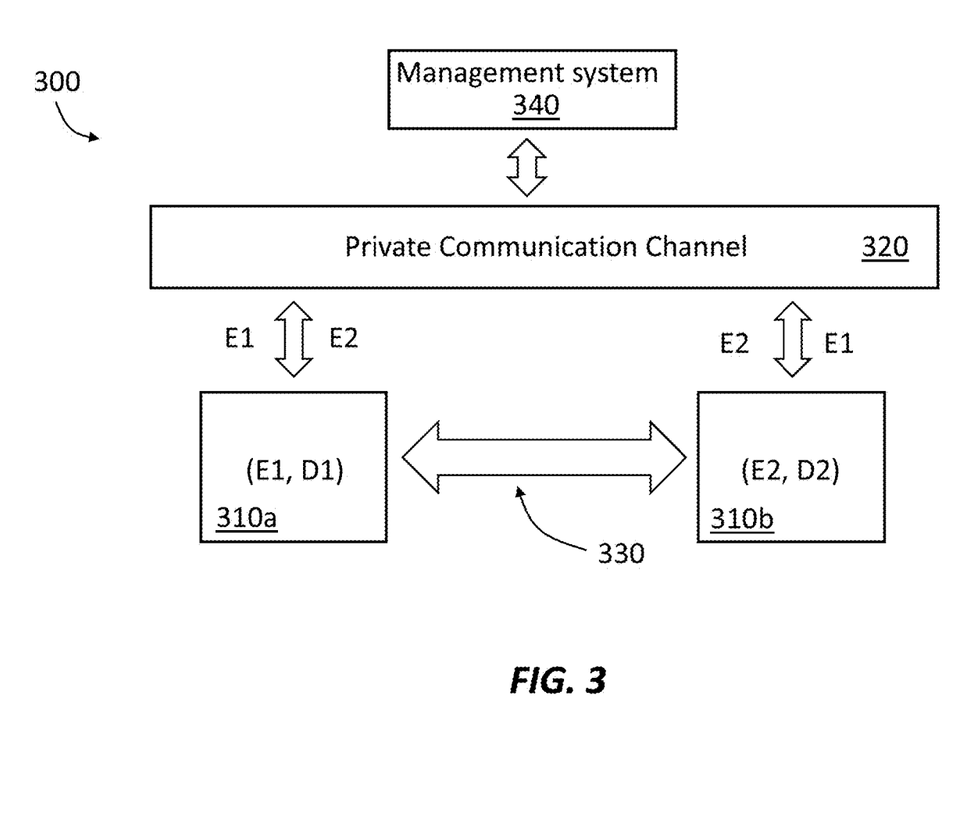
FIG. 3 shows a schematic of a system for secure network communication, according to an embodiment.

FIG. 3 shows a schematic of a system 300 for secure network communications, according to an embodiment. The system 300 includes a first entity 310a and a second entity 310b, collectively referred to as entities 310, also referred to as nodes or parties or network equipment. The entities 310 are communicatively coupled together via a private channel 320 and a public channel 330. The private channel 320 and the public channel 330 do not need to connect the entities 310 all the time. In some implementations, the private channel 320 can be available only during the provisioning of the entities 310, and the public channel 330 is then used for all other communications between the two entities 310.

The system 300 also includes a management system 340 to facilitate the provisioning of the two entities 310 via the private channel 320. For example, each entity that wishes to join the closed user group can send its public key to the management system 340 via the private channel 320, and the management system 340 stores the public key and distributes the public key of the asymmetric key pair for that entity to every other entity that is already in the closed user group.

In some embodiments, the private channel 320 can further include two sections: a first section connecting the management system 340 with the first entity 310a and a second section connecting the management system 340 with the second entity 310b. For example, the first section can include a first local cable connecting the first entity 310a with the management system 340, and the second section can include a second local cable connecting the second entity 310b with the management system 340. During the provisioning of the first entity 310a, the first section is employed for the key distribution and the second section may not be needed because the management system 340 may already have the public key of the second entity stored in the memory. Similarly, during the provisioning of the second entity 310b, the second section of the private channel 320 is employed for the key distribution and the first section of the private channel may be closed.

In some implementations, each one of the entities 310 can be substantially similar to the apparatus 200 illustrated in FIG. 2 and described above. In some implementations, each one of the entities 310 can include components in addition to the apparatus 200, such as a power supply, a display, and input/output ports, among others.

In some embodiments, the management system 340 can be included in one of the entities 310a or 310b. In other words, one entity 310a or 310b can include an apparatus 300 and the management system 340. For example, the entity 310a and 310b can be a server, which not only manages the distribution of public keys within the system 300 but also includes a database to be shared by other entities in the system 300.

The system 300 illustrated in FIG. 3 shows two entities 310a and 310b for illustrative purposes only. In practice, the system 300 can include any other number of entities. As described above, the system 300 can be readily scaled up to include multiple entities so as to form a large-scale network.

FIG. 4 shows a flowchart illustrating a method 400 of secure network communication using a Diffie-Hellman key exchange protocol, according to an embodiment. The method 400 includes a provisioning process to distribute public keys for asymmetric encryption among different compute devices in a network. More specifically, the method 400 includes sending, from a first compute device (also referred to as an originator) to a second compute device (also referred to as a responder), a first public key in a first asymmetric key pair for asymmetric encryption via a private channel at 410. The method 400 also includes receiving, from the second compute device, a second public key in a second asymmetric key pair via the private channel at 420.

The provisioned compute devices then conduct a concurrent authentication and key generation process. During this process, the method 400 includes, at 430, sending a request from the first compute device to the second compute device. The request is encrypted at least by (1) a first private key in the first asymmetric key pair that includes the first public key and (2) the second public key in the second asymmetric key pair. The request includes a first set of Diffie-Hellman key exchange parameters and a first nonce, and the first set of Diffie-Hellman key exchange parameters is further encrypted by a temporary key via symmetric encryption.

Upon receiving the request, the second compute device is configured to generate a reply including a second set of Diffie-Hellman key exchange parameters, the first nonce, and a second nonce. The reply is encrypted by the first public key and the second private key in the second asymmetric key pair.

The first compute device receives the reply from the second compute device at 440 and processes the reply. The processing of the reply includes, generating a traffic key based on the first set and the second set of Diffie-Hellman key exchange parameters at 450 and authenticating the second compute device based on the first nonce received from the second compute device at 460. Upon completion of the concurrent authentication and key generation process, the first compute device discards the temporary key at 470 and sends a status message to the second compute device at 480. The status message includes the second nonce and being encrypted by the traffic key.

In some embodiments, the quantum resistant approach described herein can be employed to establish a sleeve communication session. In these embodiments, the request sent from the originator to the responder is also referred to as a Sleeve Establish Request. The Sleeve Establish Request includes parameters proposed by the originator, seeds for calculating a traffic key using the Diffie-Hellman algorithm, and an Establish identifier. In the seeds for calculating the traffic key, the values of the base number g and the prime number p are generally constants in the originator's software, and ($g^a$ mod p) can be calculated from unpredictably random data for this sleeve negotiation. The Establish Identifier can include an unpredictably random number (i.e., a nonce) that is returned to the originator by the responder to verify that the responder in fact correctly processed the message. The body of Sleeve Establish Request can be integrity checked using the MD5 algorithm (or other hash algorithm like SHA) to prevent tampering with the plaintext message portion and to verify that decryption proceeded properly.

The originator is also configured to create a unique random symmetric encryption (e.g., AES) key, $k_{temp}$, which is employed to encrypt Diffie-Hellman portion of the Sleeve Establish Request. The temporary key is also appended to the Establish Identifier and also RSA encrypted. The entire Sleeve Establish Request is RSA encrypted with the private key of the originator, followed by RSA encryption of the same fields using the public key of the responder.

Upon receipt of the Sleeve Establish Request, the responder decrypts the request to retrieve the Establish Identifier and the symmetric encryption key $k_{temp}$ using the private key of the responder. The responder also performs a second decryption with the public key of the originator. If decryption fails, an alarm condition is raised, and no attempt is made to respond to the (potentially bogus) originator.

If the decryption succeeds, the responder decrypts the Diffie-Hellman portion of the Sleeve Establish Message with the symmetric key $k_{temp}$ and generates its random contribution to the Diffie-Hellman key negotiation. The responder also includes the result in the Reply to the originator and saves the negotiated traffic key in a safe place. In some implementations, two keys of the same length can be extracted: a first key for transmission from originator to responder, and a second key for transmission from responder to originator. The length of the traffic key can depend on the negotiated encryption algorithm. In some embodiments, the high order n bits of the Diffie-Hellman key are used as the originator's transmitting key, and bits n+1 through 2n (ordinal from the beginning of the Diffie-Hellman result) are used as the responder's transmitting key.

The responder then creates the Reply that includes a completed Security Association ID (SAID) that can uniquely identify this sleeve to both the originator and the responder. In addition, a Reply identifier of unpredictably random data is also included in the Reply to authenticate the originator by the responder. The result of the Diffie-Hellman negotiation ($g^b$ mod p) is encrypted with the symmetric encryption key, $k_{temp}$, received from the originator, and included in the Reply. The Reply can further include the agreed-upon options for encryption.

Upon receipt of the Reply, the originator decrypts the body of the Reply using its own private key. If decryption fails, an alarm message of a bogus responder is generated. The originator compares the Establish Identifier (i.e., a nonce) with the original nominated value; if they do not match, an alarm message indicating a possible attack is generated. In contrast, a successful comparison completes the authentication of the responder to the originator.

The originator also uses the symmetric encryption key $k_{temp}$ to decrypt and save the high order 2n bits of the traffic key negotiated via Diffie-Hellman in key storage associated with the sleeve. As with the responder's logic, bits 1 through n are used as the symmetric traffic key for traffic moving from originator to responder, and bits n+1 through 2n are used for traffic from responder to originator. At this moment, the key $k_{temp}$ may be discarded.

The originator also generates an initial Status message (encrypted with the Diffie-Hellman agreed session key), which indicates that the responder may use the sleeve to send traffic upon receipt of this Status message. The payload of the Status message includes the Reply Identifier (i.e., nonce created by the responder). Once the Status has been sent the originator may follow up with traffic messages.

The responder receives the initial Status message and checks the Reply Identifier against the value the responder manufactured when the Reply was sent. If they do not match, an alarm is raised indicating a probable attack and the sleeve is terminated. If the Reply Identifier is matched, then the sleeve is fully operational and the responder can transmit any messages which have been queued pending completion of the sleeve connection.

Figure 5:
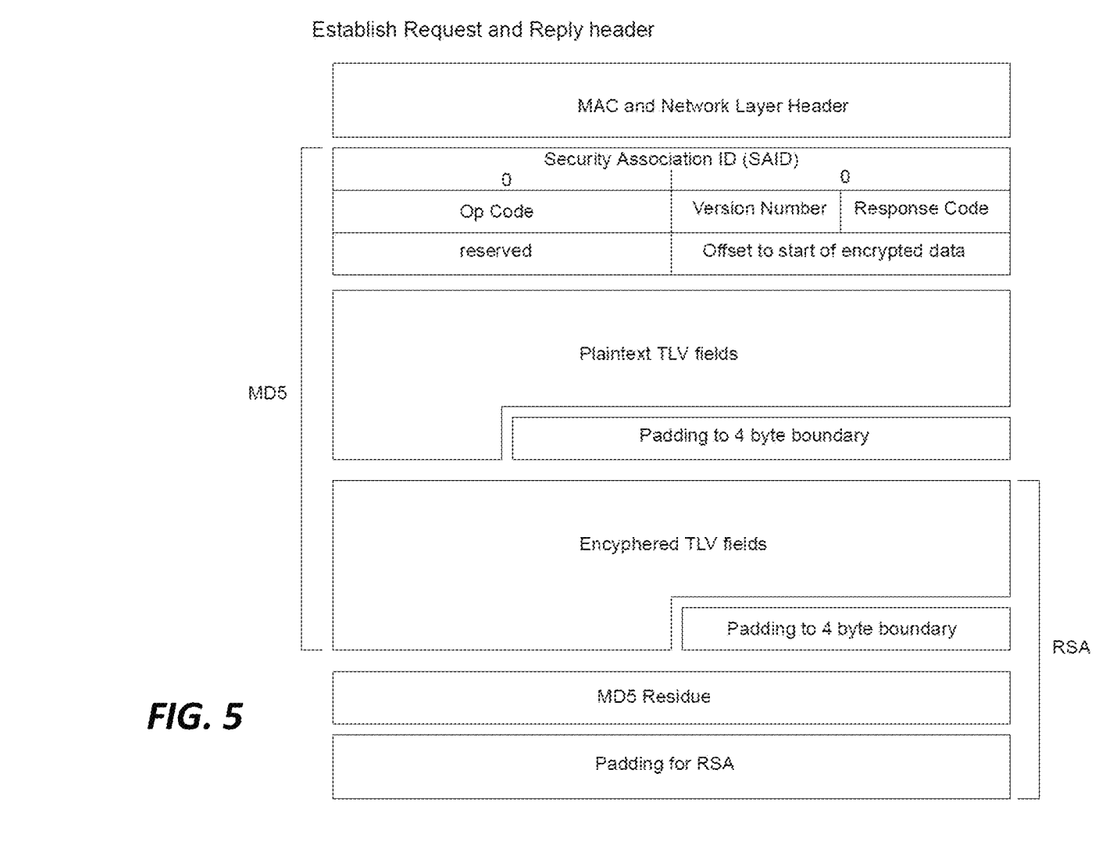
FIG. 5 shows structures of a request message and a reply message that can be used in a quantum resistant approach for establishing a secure communication session, according to an embodiment.

FIG. 5 shows structures of a request message and a reply message, respectively, that can be used in a quantum-resistant approach for establishing a secure communication session, according to an embodiment. Session Establishment using the request and reply messages shown in FIG. 5 can take place in three phases. During the first phase, the originator sends an Establish Request message to the responder (e.g., a compute device, such as a server). The Establish Request contains authentication data for the originator, Diffie-Hellman key exchange parameters, proposed session and crypto Quality of Service (QoS) settings, and an Originator nonce value.

During the second phase, the responder authenticates the Originator. Upon successful authentication, the responder returns an Establish Reply message back to the originator, which includes the second half of D-H key exchange, negotiated session and crypto QoS values, and a Responder nonce value.

During the third phase, the originator responds with an Initial Status message, encoded with the agreed-upon crypto transforms, containing the responder nonce. After the responder receives the Initial Status and verifies that its nonce is correctly returned, flow of data traffic commences.

As illustrated in FIG. 5, the Establish Request message structure is sent as a UDP datagram to the responder. The protocol header of the Establish Request distinguishes the message as a new session request message, distinct from traffic and maintenance messages.

The responder, during the second phase, finds the public key identifier in the plaintext part of the Establish message, and uses the appropriate public key to decrypt the message. At this point, the responder has authenticated the originator to its satisfaction. The responder then performs policy checks to confirm that the originator proposes a policy that is satisfactory to the responder, and further confirm that they can mutually agree on cryptographic transforms.

The Reply message sent back to the originator also has a two-part construction. The plaintext portion contains the second half of key exchange, and any negotiated session parameters that are not fit in the second encrypted area. The second half is encrypted with the responder's public key and includes the responder's nonce, the originator's nonce, and the MD5 residue of all values returned. In this protocol, persistent data can be sent out without encryption.

Once the originator has successfully decrypted the Reply message and verified the return of its nonce, the originator has completed session negotiation because the originator has authenticated the Responder and exchanged key material and session parameters. To complete the session establishment, the originator sends an Initial Status message to the responder. This Initial Status message is encoded using the agreed-upon crypto transforms between the two parties, using the key material negotiated in the Diffie-Hellman exchange. This Initial Status contains the responder's nonce, thereby allowing the responder to authenticate the originator by comparing the received nonce with the nonce the responder sent out in the Reply.

Figure 6:
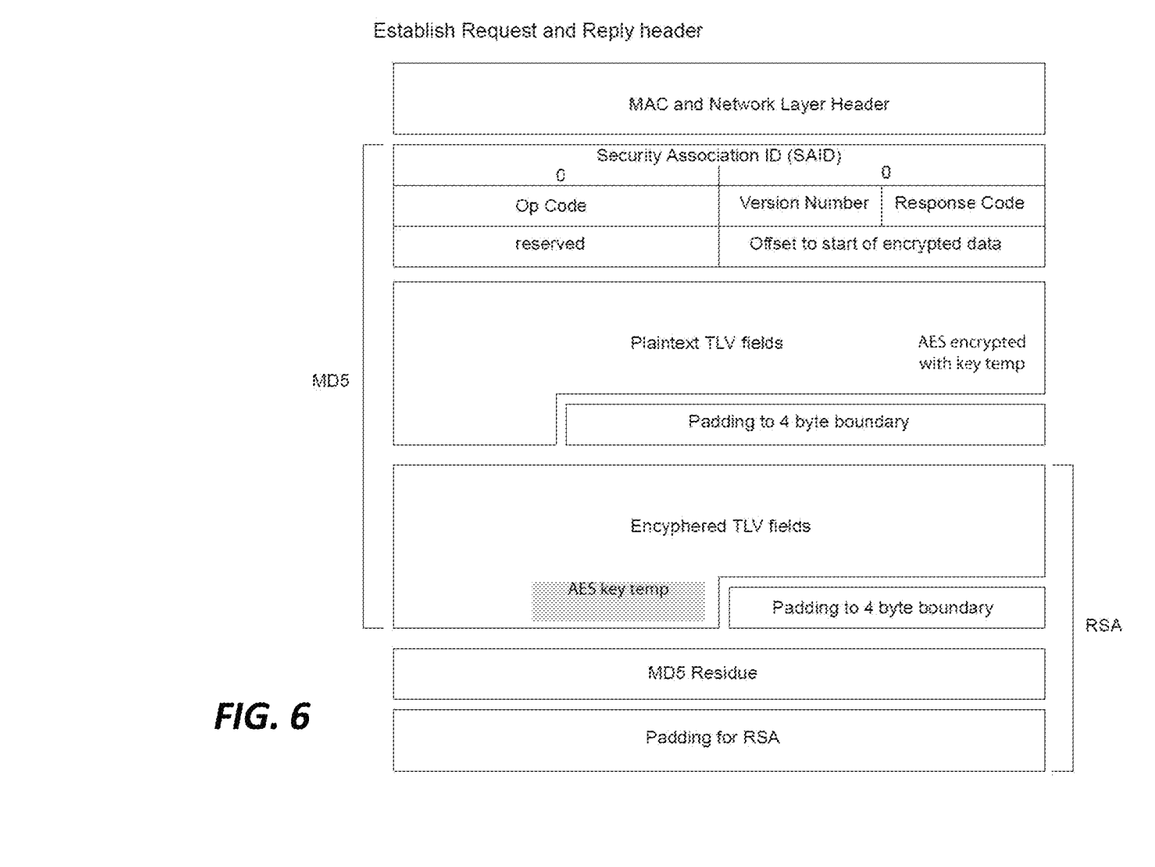
FIG. 6 shows a structure of a request message and a reply message including a temporary key encrypted via RSA encryption for establishing a secure communication session, according to an embodiment.

FIG. 6 shows a structure of a request message and a reply message including a temporary key encrypted via RSA encryption for establishing a secure communication session, according to an embodiment. Compared to the structure shown in FIG. 5, the messages in FIG. 6 use RSA encryption to encrypt the temporary key (i.e., one-time use symmetric encryption key for encrypting the Diffie-Hellman key exchange parameters). The original plaintext type-length-value (TLV) field, which includes the Diffie-Hellman parameters, is labeled as AES encrypted using the temporary key. This approach can prevent quantum computing attacks upon the Diffie-Hellman protocol used to derive the session key.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    sending a request to a compute device, the request being encrypted at least by a private key of an asymmetric key pair that includes a public key, the request including a first set of Diffie-Hellman key exchange parameters and a nonce, the first set of Diffie-Hellman key exchange parameters further encrypted by a temporary key;
    receiving a reply from the compute device, the reply being encrypted at least by the public key and including a second set of Diffie-Hellman key exchange parameters so as to generate a traffic key, the reply further including the nonce;
    encrypting a message using the traffic key; and
    sending the message to the compute device after the temporary key has been discarded.

2. The method of claim 1, further comprising:
    sending, to the compute device and via a private channel, the public key for asymmetric encryption.

3. The method of claim 1, further comprising:
    sending, to the compute device, via a private channel, and via a management system, the public key for asymmetric encryption, the sending the request and the receiving the reply done without using the management system.

4. The method of claim 1, further comprising:
    sending the public key to a management system; and
    sending the public key to the compute device via a local cable between the management system and the compute device.

5. The method of claim 1, wherein the message is sent to the compute device after the encrypting the message using the traffic key.

6. An apparatus, comprising:
    a memory; and
    a processor operatively coupled to the memory and configured to:
        generate a request including a first set of Diffie-Hellman key exchange parameters and a nonce;
        encrypt the first set of Diffie-Hellman key exchange parameters using a temporary key via a random symmetric encryption;
        encrypt the request using at least a private key of an asymmetric key pair that includes a public key to generate an encrypted request;
        send the encrypted request to a compute device;
        receive a reply from the compute device, the reply being encrypted by the public key and including a second set of Diffie-Hellman key exchange parameters and the nonce;
        generate a traffic key using the first set and the second set of Diffie-Hellman key exchange parameters;
        authenticate the compute device based on the nonce; and
        discard the temporary key after authenticating the compute device.

7. The apparatus of claim 6, wherein the processor is further configured to:
    send a message to the compute device, the message being encrypted using the traffic key via symmetric encryption.

8. The apparatus of claim 6, wherein the processor is further configured to:
    send the public key via a management system,
    the processor configured to generate the request, encrypt the request, send the encrypted request, receive the reply, and generate the traffic key without using the management system.

9. The apparatus of claim 6, wherein the processor is further configured to:
    send the public key for asymmetric encryption via a private channel.

10. The apparatus of claim 6, wherein the processor is further configured to:
    send the public key for asymmetric encryption to a management system via a private channel and via a local cable between the apparatus and the management system.

11. The apparatus of claim 6, wherein the processor is further configured to:
    send the public key via a private channel for asymmetric RSA encryption.

12. The apparatus of claim 6, wherein the processor is configured to perform the generating the request, the encrypting the request, the sending the encrypted request, the receiving the reply, and the generating the traffic key via a public channel.

13. An apparatus, comprising:
    a memory; and
    a processor operatively coupled to the memory and configured to:
        decrypt a request using a first public key, the request including a first set of Diffie-Hellman key exchange parameters and a first nonce, the request being encrypted using a first private key of a first asymmetric key pair that includes the first public key, the first set of Diffie-Hellman key exchange parameters encrypted by a temporary key;
        generate a reply including the first nonce, a second set of Diffie-Hellman key exchange parameters, and a second nonce;
        encrypt the reply using a second private key in a second asymmetric key pair that further includes a second public key and
        receive a message from a compute device after the temporary key has been discarded.

14. The apparatus of claim 13, wherein the request is further encrypted using the second public key and the processor is further configured to:
    encrypt the reply using the first public key.

15. The apparatus of claim 13, wherein the processor is further configured to:
    receive the first public key from the compute device and via a private channel; and
    send the reply to the compute device.

* * * * *